United States Patent [19]

McGuckin et al.

[11] Patent Number: 5,188,662
[45] Date of Patent: Feb. 23, 1993

[54] SILVER RECOVERY PROCESS

[75] Inventors: Hugh G. McGuckin; John S. Badger, both of Rochester, N.Y.

[73] Assignee: Eastman Kodak Company, Rochester, N.Y.

[21] Appl. No.: 724,577

[22] Filed: Jun. 28, 1991

[51] Int. Cl.$^5$ .............................................. C22B 3/46
[52] U.S. Cl. .................... 75/713; 210/638; 210/757
[58] Field of Search ................. 75/417, 713; 210/679, 210/688, 912, 638, 757; 423/23, 25

[56] References Cited

U.S. PATENT DOCUMENTS

| | | | |
|---|---|---|---|
| 3,173,789 | 3/1965 | King et al. | 96/61 |
| 3,179,517 | 8/1959 | Tregillus et al. | 96/29 |
| 3,834,546 | 9/1974 | Brun et al. | 210/321 |
| 4,038,080 | 7/1977 | Fisch et al. | 96/60 |
| 4,227,681 | 10/1980 | Golben | 266/170 |
| 4,280,925 | 7/1981 | Kiefer | 210/679 |
| 4,325,732 | 4/1982 | Woog | 75/109 |
| 4,882,056 | 11/1989 | Degen et al. | 210/490 |
| 4,988,448 | 1/1991 | Woog | 210/665 |

FOREIGN PATENT DOCUMENTS

| | | |
|---|---|---|
| 64-50047 | 2/1989 | Japan . |
| 940169 | 10/1963 | United Kingdom . |
| 1144481 | 3/1969 | United Kingdom . |

*Primary Examiner*—Melvyn J. Andrews
*Attorney, Agent, or Firm*—L. George Legg

[57] ABSTRACT

A process for treating a photographic developer solution containing silver ion comprises contacting the solution with a silver recovery element (10), which comprises a substrate (12) having thereon a hydrophilic colloid layer (16) containing physical development nickel. The contacting is carried out for a time sufficient to reduce the silver concentration in the developer solution to a desired level. The process is useful for treating a seasoned or unseasoned photographic developer solution containing silver ions.

9 Claims, 2 Drawing Sheets

SILVER RECOVERY PROCESS

FIELD OF THE INVENTION

The instant invention relates to a process for recovering silver from a photographic developer solution. In particular, it relates to a process of contacting a photographic developer solution containing silver ions with a silver recovery element for a time sufficient to reduce the concentration of silver to a desired level.

BACKGROUND OF THE INVENTION

Photographic developer solutions can contain undesirably high amounts of silver. Silver lost in effluent streams can present an economic cost as well as an environmental discharge concern. A seasoned photographic developer solution containing silver can also contain sulfite or organic amines, which can react with silver in a photographic element to increase the amount of silver complex in solution. The silver complex tends to undergo reduction and form silver sludge. Silver sludge is a problem because it can decrease the practical useable lifetime of the developer solution. The silver sludge can foul developer apparatus such as rollers and belts and the like, and consequently foul photographic materials in contact with such apparatus, resulting in poor photographic quality. Silver sludge can also interfere with the flow of developer solution, resulting in poor photographic finish. Silver sludge formation on the developer apparatus and on the walls of the development tanks can necessitate more frequent maintenance and cleaning and result in more down time of the apparatus.

Efforts to minimize silver sludge formation have met with limited success. Some prior art methods employ the addition of mercapto or related compounds to the developer solution to inhibit the formation of silver sludge. A problem with this approach is that such additives can inhibit photographic development and decrease sensitivity. Another problem is that mercapto compounds tend to oxidize, which decreases the silver sludge-inhibiting effects.

Another prior art approach is the use of such mercapto compounds as a component in a photographic emulsion layer. This, however, can result in loss of photographic performance, such as speed and sensitivity loss.

Another prior art approach for recovering silver from a photographic developer solution employs a film having a hydrophilic colloid layer which contains a compound, such as a mercapto compound, capable of adsorbing silver. This can also have the above-noted problems concerning mercapto or related silver adsorbing compounds.

Also known is the use of physical development nuclei (sometimes termed active nuclei), such as Carey Lea Silver, as silver precipitating agents. They can be used to cause silver sludge to settle to the bottom of a development tank. This approach, however, does not result in satisfactorily decreasing, or eliminating, the problem of silver sludge formation.

Another prior art approach is to provide a silver precipitating layer in a photographic element having an image-forming silver halide layer. The silver precipitating layer, which can comprise a hydrophilic colloid containing metal sulfides or colloidal metals, e.g. Carey Lea silver, can decrease the migration of silver or silver halide and lessen silver buildup in a photographic developer solution. A problem with this approach is that silver and silver halide captured in the precipitating layer can impede light transmission and result in decreasing the photographic quality of the exposed film and developed image.

Also known is a processing element comprising a hydrophilic element containing a dispersed silver-precipitating agent, for example a physical development nuclei such as Carey Lea silver. The element is used, however, in a diffusion transfer photographic development process and not for silver recovery.

RELATED ART

U.S. Pat. No. 3,179,517 discloses a diffusion transfer photographic development process employing a processing element comprising a hydrophilic element, with or without a support, containing dispersed silver-precipitating agent, e.g. physical development nuclei such as Carey Lea silver.

U.S. Pat. No. 3,173,789 discloses a method and composition for inhibiting silver sludge in thiosulfate monobaths by using mercapto compounds in the monobath composition.

U.S. Pat. No. 4,325,732 discloses a metal recovery apparatus and method employing an exchange mass within which is dispersed particles of a replacement metal.

U.S. Pat. No. 4,227,681 discloses a silver recovery cartridge having a metallic filler and a porous pad thereon.

U.S. Pat. No. 4,882,056 discloses a fluid treatment element comprising a permeable cartridge with a permeable core on which is disposed polymeric microfibers.

U.S. Pat. No. 4,038,080 discloses a desilvering method in which metallic silver or other particulate material can be added to a silver containing solution to supply nucleating sites for the silver in solution.

U.S. Pat. No. 3,834,546 discloses a semi-permeable fluid separation apparatus comprising a core, a textile sheath, and a semi-permeable membrane.

U.S. Pat. No. 4,988,448 discloses a method and apparatus for removing constituents from a waste solution, which apparatus comprises a cylindrical housing with an inlet, an outlet, and a filter material such as rolled fiberglass.

Jap. Published Patent Appl'n. 89-50047 discloses a cleaning film and method for preventing the production of silver sludge in a development solution. The cleaning film is described as having a hydrophilic colloid layer which contains a compound that can adsorb silver ions or silver metal above a substrate. It does not describe Applicants' method or assembly employing a media containing physical development nuclei to treat developer solutions.

U.K. 940,169 discloses developer additive compounds for preventing the formation of precipitates in photographic developers.

U.K. 1,144,481 discloses a monobath solution comprising o-mercaptobenzoic acid to control the formation of sludge.

SUMMARY OF THE INVENTION

The invention provides a process for recovering silver from a photographic developer solution containing silver ions. The process comprises contacting the solution with a silver recovery element, such element comprising an inert substrate having thereon a hydrophilic colloid layer containing physical development nuclei. The contacting is for a time sufficient to reduce the concentration of silver in the solution to a desired level.

The hydrophilic colloid layer can be gelatin. In one embodiment of the invention, Carey Lea silver is employed in a coverage of from about 430 mg/m$^2$ to about 1075 mg/m$^2$ of the hydrophilic colloid, e.g. gelatin. The Carey Lea silver can have an average diameter in the range of from about 10 Å to about 500 Å.

The invention has several advantages over prior art methods directed towards the problem of silver sludge formation in photographic developer solutions. The invention provides a material which when immersed in a developer solution serves as a catalytic surface for the physical development of complexed silver ion which would otherwise form silver sludge. It does not require the introduction into the developer solution of silver precipitating agents that can adversely affect photographic performance or development of the latent image. The invention restrains the plating out of silver on the surfaces of the developer tank and transport rollers.

The element and process of the invention also provide good silver removal to prolong the useful life of the developer solution and prevent the rapid change in solution color associated with the formation of silver sludge. It delays the need for cleaning the developer tank and rollers with a systems cleaner. The materials comprising the recovery element used in the process are readily available and economical to use.

DESCRIPTION OF PREFERRED EMBODIMENTS

Figure 1:
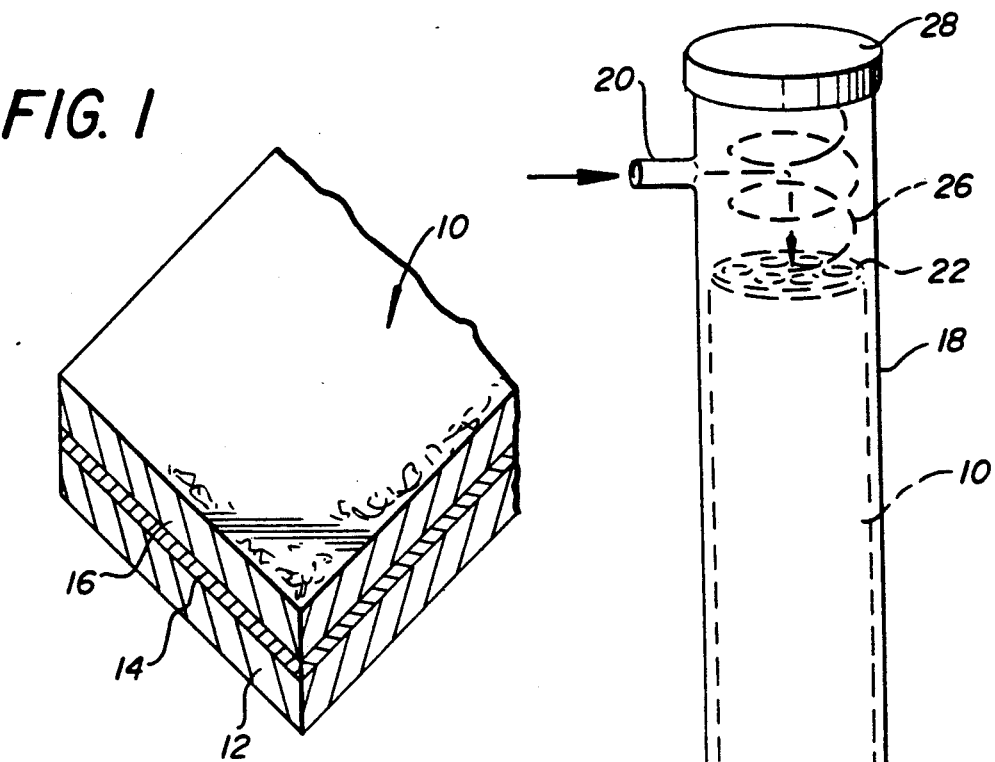
FIG. 1 is an enlarged, fragmentary, cross-sectional view of a silver recovery element useful in the process of the invention.

The present invention provides a process for recovering silver from a photographic developer solution containing silver ions, the process comprising contacting the solution with a silver recovery element, such element comprising an inert substrate having thereon a hydrophilic colloid layer containing physical development nuclei; and the contacting being for a time sufficient to reduce the concentration of silver in the solution to a desired level.

The substrate must be inert, that is, it must be substantially nonreactive with the hydrophilic colloid, the physical development nuclei, and the developer solution. One skilled in the art can select an inert substrate. An optional subbing layer can be employed between the substrate and the hydrophilic colloid layer. Exemplary useful substrates, for example poly(ethylene terethphlate) ("PET"), and subbing layer materials and techniques are described in *Research Disclosure*, Kenneth Mason Publications, Ltd., Emsworth, England, Volume 308, December 1989, Item 308119, section XVII, incorporated by reference as if fully set forth herein.

The physical development nuclei can comprise any suitable well-known agent which does not exert adverse effects on the photographic element. Physical development nuclei are well known in the art, e.g., as set forth in U.S. Pat. No. 3,737,317 and U.S. Pat. No. 3,179,517. Typical physical development nuclei useful in the practise of the invention include metal sulfides, metal selenides, metal polysulfides, metal polyselenides, stannous halides, heavy metals and heavy metal salts and mixtures thereof. Heavy metal sulfides such as lead, silver, zinc, antimony, cadmium and bismuth sulfides are useful. In one embodiment of the invention, nickel sulfide is employed as the physical development nuclei.

Heavy metals, e.g. noble metals, are useful as physical development nuclei in the invention, such as silver, gold, platinum, and palladium and mixtures thereof, preferably in the colloidal form. In one embodiment the noble metal can comprise particles of colloidal silver, such as Carey Lea silver.

The amount of physical development nuclei in the hydrophilic layer can be selected based on factors such as activity, dispersability of the nuclei in the layer, cost of fabrication of the recovery element, desired removal efficiency of the element, and so forth. In one embodiment the physical development nuclei comprises Carey Lea silver in an amount from about 430 mg/m$^2$ to about 1075 mg/m$^2$.

The size of the physical development nuclei can be selected based on performance factors for the particular type of physical development nuclei selected. For example, Carey Lea silver nuclei having an average pre-treatment diameter in the range of from about 10 Å to about 500 Å are useful as physical development nuclei in the invention. By "average pre-treatment diameter" is meant the average diameter of Carey Lea silver nuclei prior to the use of the silver recovery element to treat a silver-containing solution. During treatment the average diameter should increase because silver is removed from solution and accumulates on or near the Carey Lea silver nuclei. Too low a diameter can have the effect of increasing the time to remove the desired amount of silver from solution. Too high a diameter can limit the effectiveness of the element in removing silver. A preferred average pre-treatment diameter is about 300 Å.

The hydrophilic colloid layer can comprise a hydrophilic colloid such as those disclosed in *Research Disclosure*, Kenneth Mason Publications, Ltd., Emsworth, England, Volume 308, December 1989, Item 308119, section IX. Useful hydrophilic colloids include proteins, gelatin, and polysaccharides such as dextrin, to name but a few. In one embodiment of the invention, bone-derived gelatin is the hydrophilic colloid.

Typically, the hydrophilic colloid layer is cross-linkable and can further comprise a hardener as note above. Alternatively or additionally, a hardener can be added to the developer solution. One skilled in the art can readily select a hardener that is compatible with the particular hydrophilic colloid, and when a different hardener is employed in the colloid layer and the developer solution, hardeners that are mutually compatible should be selected. Typical useful hardeners are those such as are disclosed in *Research Disclosure*, Kenneth Mason Publications, Ltd., Emsworth, England, Volume 308, December 1989, Item 308119, section X. In one embodiment of the invention, bis vinylsulfonylmethyl ether, disclosed in U.S. Pat. No. 3,841,872 (Reissue No. 29,305), Burness et al, is a hardener used in the hydrophilic colloid layer.

The solution being treated by the process of the invention is a photographic developer solution containing silver ions. The solution can comprise a seasoned photographic developer solution or an unseasoned photographic developer solution.

When carrying out the process of the invention, the step of contacting the developer solution with the silver recovery element should be for a time sufficient to reduce the concentration of silver in the developer solution to a desired level. The desired final silver concentration and treatment time are readily determinable by the operator, and can be influenced by factors such as solution flow rate, starting silver concentration, and the efficiency and coating coverage of the physical development nuclei. In one embodiment, the treatment time to reduce silver concentration from about 80 mg/liter to about 25 mg/liter is about 4 hours, and from about 80 mg/liter to about 15 mg/liter is about 6 hours.

The process can be carried out at a temperature in the range of from about 50° F. (10° C.) to about 95° F. (35° C.). A preferred process temperature is in the range of from about 70° F. (21.1° C.) to about 95° F. (35° C.). The process can be conducted at any pressure in the range of from about atmospheric pressure for a stated set of reaction conditions to about 100 atmospheres.

The process described hereinabove is further illustrated in FIG. 1 which schematically illustrates apparatus for carrying out the process of the invention. As shown therein, silver recovery element 10 comprises support 12 on a surface of which is coated optional subbing layer 14. Hydrophilic colloid layer 16, e.g. gelatin, is coated on subbing layer 14, or in the absence of subbing layer 14 onto support 12. Layer 16 can be coated on both such sides of element 10. Layer 16 contains physical development nuclei such as Carey Lea silver and an optional hardener. Element 10 can thus comprise a sheet or web, either substantially flat or configured to suit the convenience of the operator, that can be contacted with a seasoned or unseasoned photographic developer solution.

Figure 2:
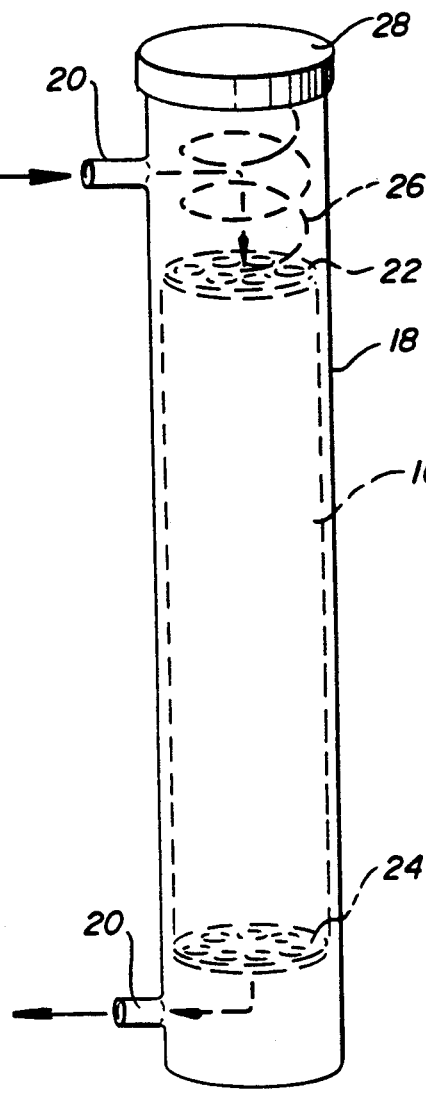
FIG. 2 is an enlarged schematic view of a silver recovery canister with the silver recovery element shown in phantom.

Any convenient means for positioning the silver recovery element into contact with the developer solution may be employed. For example, the media can be placed in a suitable tray, developer tank, or other container with developer solution, in which a conventional mixing means such as a magnetic stirrer can be provided to promote good mixing and good contact of the media with the developer solution. For example, as shown in FIG. 2, element 10 can by cylindrical in shape and so positioned in developer canister 18. Canister 18 can be connected to a photoprocessing developer recirculation system, described below, wherein developer solution is provided to and returned from ports 20 as illustrated by the direction arrows. Distributor plates 22 and 24 are positioned as shown to distribute solution flow respectively into and out of element 10 and as means for retaining element 10. Retaining element 26 retains distributor plate 22 with respect to end cap 28. Solution flow into and out of recovery element 10 is illustrated by the direction arrows.

Figure 3:
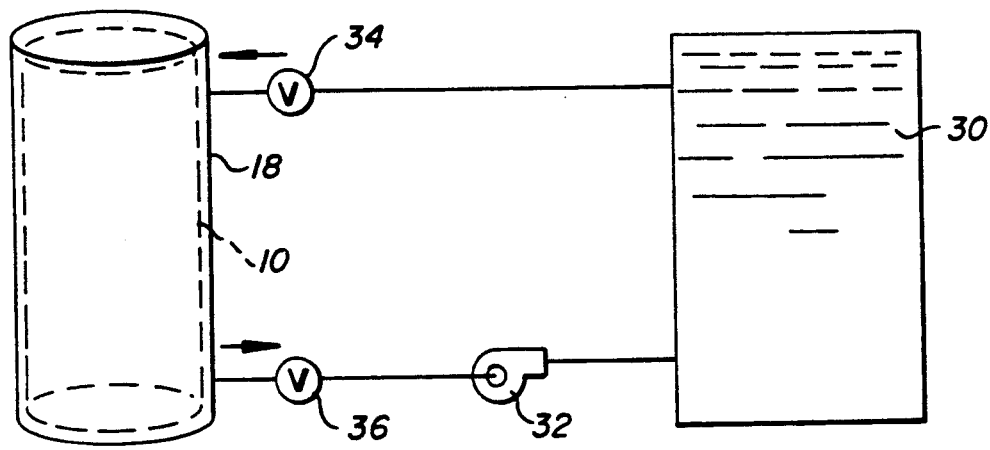
FIG. 3 is a schematic diagram of a photoprocessing developer recirculation system containing a silver recovery element useful in the process of the invention.

FIG. 3 illustrates a photoprocessing developer recirculation system containing a silver recovery element useful in the process of the invention, developer solution flow being indicated by the direction of flow arrows. Developer solution is provided to film developer tank 30 by recirculating pump 32. The developer solution flows through tank 30 in which exposed photographic film can be developed, through optional flow control valve 34, and to silver recovery canister 18 that contains recovery element 10. After flowing through recovery element 10, developer solution is recirculated through optional flow control valve 36 to pump 32. As stated above, the invention may also be practised without tank 30, that is, circulating developer solution through silver recovery canister 18 without tank 30 being connected in to the system.

The invention is further illustrated by the following example of its practice.

EXAMPLE 1

A 7 mil (0.18 mm) thick poly(ethylene terephthalate) support was coated with the following formulation:

2000 mg/ft$^2$ (2.15 mg/cm$^2$) of 12.5% by weight photographic grade gelatin dispersion 20 mg/ft$^2$ (215.29 mg/m$^2$) of 2.0% by weight solution of bisvinylsulfonyl methylether (hardener)

40 mg/ft$^2$ (430.57 mg/m$^2$) of 4.9% Carey Lea silver in a 9 percent by weight of photographic grade gelatin dispersion To season a developer solution, ten unexposed 8" by 10" sheets of KODALINE TM Rapid Film were individually tray processed at 110° F. (43.3° C.) in 400 ml of Kodak RA-2000 developer solution for 60 seconds with continuous agitation. The initial silver ion concentration of the seasoned developer solution was then determined by atomic absorption analysis at 70° F. (21.1° C.) to be 80 mg/liter. 50 ml of the seasoned developer solution was then added to a plastic container containing the coated support and the solution was stirred.

Figure 4:
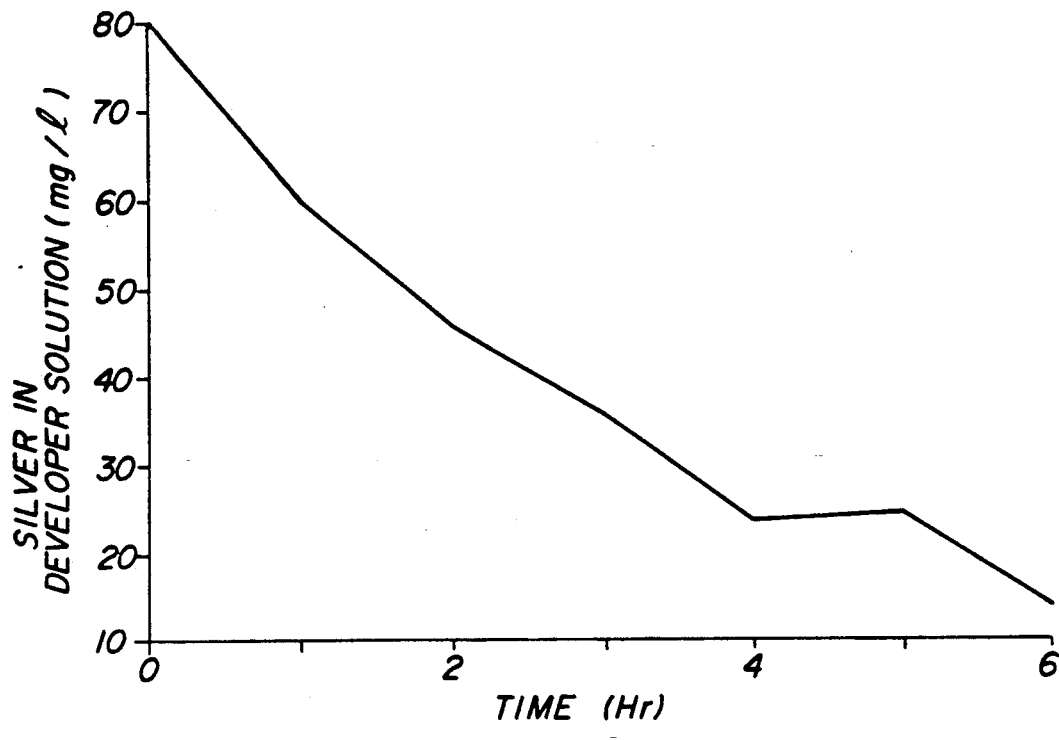
FIG. 4 is a graph of silver concentration in a seasoned developer solution versus treatment time for a comparison prior art silver recovery element.

The silver concentration in solution was obtained by atomic absorption at 70° F. (21.1° C.) after 1, 2, 3, 4, 5, and 6 hours. The results are shown in FIG. 4. The silver concentration decreased from 80 mg/liter down to 14 mg/liter over the 6 hour period.

Figure 5:
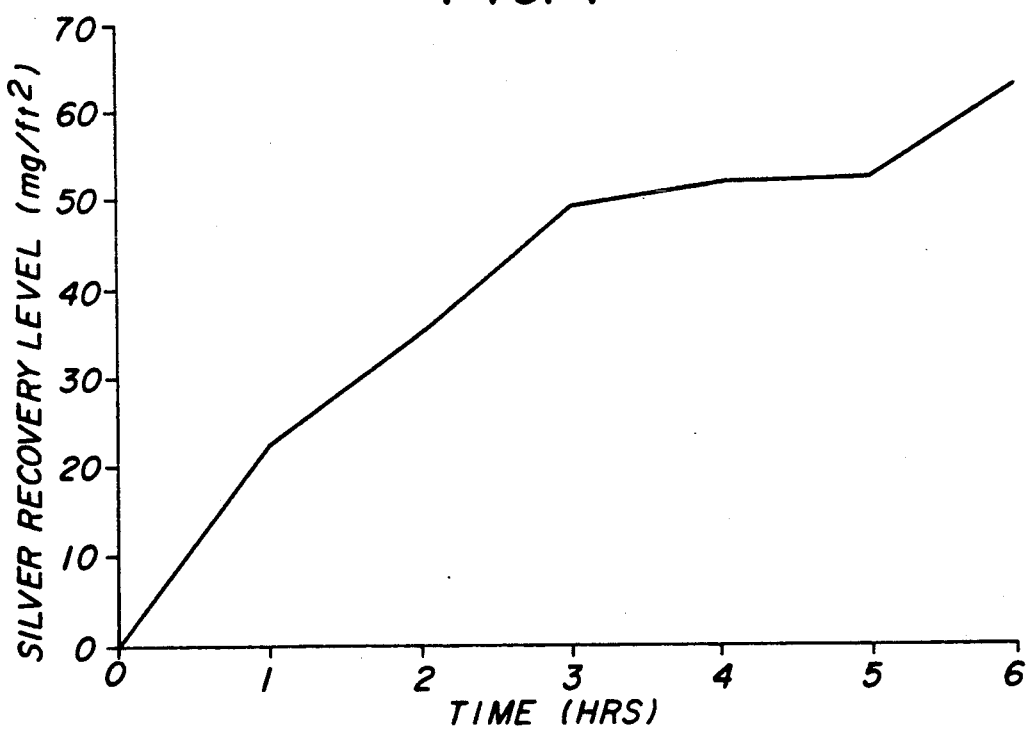
FIG. 5 is a graph of silver level in a silver recovery element versus treatment time for a comparison prior art silver recovery element.

The amount of silver physically developed in the coated support was measured by atomic absorption at 70° F. (21.1° C.) and found to be 22.5 mg/ft$^2$ (242.20 mg/m$^2$) after 1 hour and 63.0 mg/ft$^2$ (678.15 mg/m$^2$) after 6 hours, demonstrating that as silver is removed from the developer solution it is physically developed in the coated support. The results are shown in FIG. 5.

The test results in Example 1 show good silver recovery for the process of the invention as shown by the demonstrated decrease in silver concentration of the developer solution.

EXAMPLE 2

Another type of physical development nuclei, nickel sulfide, was also tested. A 4 mil (0.10 mm) thick subbed poly(ethylene terephthalate) support was coated with the following formulation:

2000 mg/ft$^2$ (2.15 mg/cm$^2$) of 12.5% by weight photographic grade gelatin dispersion 20 mg/ft$^2$ (215.29 mg/m$^2$) of 2.0% by weight solution of bisvinylsulfonyl methylether (hardener)

0.7 mg/ft$^2$ (7.54 mg/m$^2$) of nickel sulfide To season a developer solution, thirty unexposed 8" by 10" sheets of KODALINE TM Rapid Film were individually tray processed at 110° F. (43.3° C.) in 1 liter of Kodak RA-2000 developer solution for 60 seconds with continuous agitation. Two hundred milliliters of the seasoned developer solution were introduced into each of four beakers. A 15.2 cm×3.5 cm sample of the coated support was coiled and placed in the developer solution in each beaker. Each developer solution was stirred at about 800 rpm using a Sybron Thermolyne Multi-Stir Plate "4".

The silver concentration in solution was obtained by atomic absorption at 70° F. (21.1° C.) initially and at 1, 2, and 3 hours. Silver analyses were also obtained for each of the coating samples by X-ray fluoresence initially and at 1, 2, and 3 hours. The results are shown in Table 1, below. The silver concentration in solution decreased from 69.9 mg/liter to 51.4 mg/liter over the 3 hour period. The amount of silver physically developed in the coated support increased from 0 to 60.4 mg/ft$^2$ (242.20 mg/m$^2$) after 1 hour and 63.0 mg/ft$^2$ (650.17 mg/m$^2$) after 3 hours, demonstrating that as silver is removed from the developer solution it is physically developed in the coated support.

The results show that a physical development nuclei other than Carey Lea silver, e.g. nickel sulfide, is effective for recovering silver from solution.

TABLE 1

| Time (hours) | Silver Concentration in Developer Solution (mg/liter) | Silver Level in Coated Sample (mg/m$^2$) |
|---|---|---|
| Initial | 69.6 | 0 |
| 1 | 61.6 | 33.7 |
| 2 | 55.5 | 48.9 |
| 3 | 51.4 | 60.4 |

The present invention can be advantageously employed in treating photographic developer solutions containing silver ion. It provides significant benefits. For example, it does not require the introduction into a developer solution of silver precipitating agents that can adversely affect photographic performance or development of the latent image. The process of the invention provides good silver removal to prolong the useful life of the developer solution. It does not require deploying a silver recovery layer in a photographic element which can adversely affect the photographic quality of the developed, exposed film.

The process of the invention is useful in removing silver from a photographic developer solution that could otherwise form silver sludge and foul the recirculator for the developer solution and other developer apparatus. This can result in improved performance of such apparatus, e.g. decreased time out of service and decreased maintenance. Improved uniformity of flow of the developer solution can also result, leading to higher photographic quality of the exposed, developed film. The invention is also useful in removing silver from an effluent stream and thus can help meet environmental discharge limits.

This invention has been described above with particular reference to preferred embodiments. A skilled practitioner familiar with the detailed description above, can make many substitutions and modifications without departing from the scope and spirit of the appended claims.

We claim:

1. A process for recovering silver from a photographic developer solution containing silver ions, said process comprising contacting said solution with a silver recovery element, said element comprising an inert substrate having thereon a hydrophilic colloid layer containing physical development nuclei for physical development of complexed silver ion from the developer solution; and said contacting being for a time sufficient to reduce the concentration of silver in said solution to a desired level.

2. The process of claim 1, wherein said physical development nuclei comprise particles of colloidal silver.

3. The process of claim 1, wherein said physical development nuclei comprises nickel sulfide.

4. The process of claim 1, wherein said hydrophilic colloid layer is gelatin.

5. The process of claim 1, wherein said physical development nuclei is Carey Lea silver in an amount from about 430 mg/m$^2$ to about 1075 mg/m$^2$.

6. The process of claim 1, wherein said physical development nuclei is Carey Lea Silver having an average diameter in the range of from about 10 Å to about 500 Å.

7. The process of claim 1, wherein said hydrophilic colloid layer contains a hardener.

8. The process of claim 1, wherein said solution contains a hardener.

9. The process of claim 1, wherein said solution is a seasoned photographic developer solution.

* * * * *